US008458320B2

(12) United States Patent
Keohane et al.

(10) Patent No.: US 8,458,320 B2
(45) Date of Patent: Jun. 4, 2013

(54) ALERTING A USER TO AN OCCURRENCE OF A SPECIFIED EVENT

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 11/845,527

(22) Filed: Aug. 27, 2007

(65) Prior Publication Data

US 2009/0063610 A1 Mar. 5, 2009

(51) Int. Cl.
*G06F 15/173* (2006.01)
*H04M 1/725* (2006.01)
*H04M 1/64* (2006.01)
*G06Q 30/00* (2006.01)

(52) U.S. Cl.
USPC ........ 709/224; 709/206; 709/207; 455/412.2; 705/14.49; 705/14.5; 719/318; 379/88.12; 379/100.05; 379/100.06

(58) Field of Classification Search
USPC .......... 709/206, 207, 224; 379/88.12, 100.05, 379/100.06; 455/412.2; 719/318; 705/14.49, 705/14.5
See application file for complete search history.

(56) References Cited

U.S. PATENT DOCUMENTS

| | | | |
|---|---|---|---|
| 5,848,396 A * | 12/1998 | Gerace | 705/7.33 |
| 6,260,148 B1 * | 7/2001 | Aggarwal et al. | 726/14 |
| 6,853,894 B1 * | 2/2005 | Kolls | 701/31.4 |
| 7,076,244 B2 * | 7/2006 | Lazaridis et al. | 455/414.2 |
| 7,269,417 B1 * | 9/2007 | Bokish | 455/428 |
| 7,363,345 B2 * | 4/2008 | Austin-Lane et al. | 709/207 |
| 7,378,939 B2 * | 5/2008 | Sengupta et al. | 340/5.64 |
| 7,412,224 B2 * | 8/2008 | Kotola et al. | 455/403 |
| 7,424,024 B2 * | 9/2008 | Chen et al. | 370/401 |
| 7,548,915 B2 * | 6/2009 | Ramer et al. | 705/14.54 |
| 7,548,955 B2 * | 6/2009 | Nicholas, III | 709/206 |
| 7,792,709 B1 * | 9/2010 | Trandal et al. | 705/26.1 |
| 7,860,934 B1 * | 12/2010 | Wolfe et al. | 709/206 |
| 8,019,820 B2 * | 9/2011 | Son et al. | 709/206 |
| 8,122,087 B2 * | 2/2012 | Sobotka et al. | 709/206 |
| 2002/0057285 A1 * | 5/2002 | Nicholas, III | 345/700 |
| 2002/0136214 A1 * | 9/2002 | Do et al. | 370/392 |
| 2004/0044736 A1 * | 3/2004 | Austin-Lane et al. | 709/206 |
| 2004/0150519 A1 * | 8/2004 | Husain et al. | 340/506 |
| 2005/0089052 A1 * | 4/2005 | Chen et al. | 370/401 |
| 2005/0165680 A1 * | 7/2005 | Keeling et al. | 705/40 |
| 2005/0177505 A1 * | 8/2005 | Keeling et al. | 705/40 |
| 2005/0221798 A1 * | 10/2005 | Sengupta et al. | 455/411 |
| 2006/0063980 A1 * | 3/2006 | Hwang et al. | 600/300 |
| 2006/0240806 A1 | 10/2006 | Demirbasa et al. | |
| 2007/0038516 A1 * | 2/2007 | Apple et al. | 705/14 |

(Continued)

*Primary Examiner* — Alina N. Boutah
(74) *Attorney, Agent, or Firm* — Yee & Associates, P.C.; David A. Mims, Jr.

(57) ABSTRACT

A user inputs event information into a data processing system which is stored in an application memory of an application. Message information contained in each incoming message received by a messaging service is compared to the event information. In the event that the message information corresponds to the event information a notification of the event is sent to a short-range wireless transmitter. The wireless transmitter transmits notification of the event to a remote receiver. Upon receipt of the wireless signal, the remote receiver triggers an alert notification notifying the user that data processing system has received the specified event.

6 Claims, 3 Drawing Sheets

U.S. PATENT DOCUMENTS

| | | | |
|---|---|---|---|
| 2007/0094128 A1* | 4/2007 | Rung et al. | 705/38 |
| 2007/0136462 A1* | 6/2007 | Nicholas, III | 709/224 |
| 2007/0143779 A1* | 6/2007 | Kaarela et al. | 725/25 |
| 2007/0195007 A1* | 8/2007 | Bear et al. | 345/1.1 |
| 2007/0226182 A1* | 9/2007 | Sobotka et al. | 707/3 |
| 2008/0009268 A1* | 1/2008 | Ramer et al. | 455/412.1 |
| 2008/0262928 A1* | 10/2008 | Michaelis | 705/14 |
| 2009/0006562 A1* | 1/2009 | Son et al. | 709/206 |
| 2009/0036159 A1* | 2/2009 | Chen | 455/556.1 |
| 2009/0119190 A1* | 5/2009 | Realini | 705/30 |
| 2009/0284611 A1* | 11/2009 | Wood et al. | 348/211.1 |
| 2009/0310580 A1* | 12/2009 | Chapman et al. | 370/338 |

\* cited by examiner

ALERTING A USER TO AN OCCURRENCE OF A SPECIFIED EVENT

BACKGROUND OF THE INVENTION

1. Field of the Invention

The embodiments herein relate generally to methods and computer code products for a data processing system. The embodiments herein relate relates generally messaging services and universal serial bus connected (USB) devices. More specifically, the present embodiments herein relate to wireless alert transmission upon receipt of a message or other information.

2. Description of the Related Art

With the proliferation of the Internet, e-mail, and instant messaging, people now have access to a wealth of information that can be retrieved in real time. However, as with all information, this electronic information received has a time-value associated with it. In order to take advantage of this information, a user must have ways of being notified. While each of the applications listed, Internet, e-mail, and instant messaging, are capable of informing a user of updates while the user is in close proximity to the computer, people are not always in a location where these applications are accessible. Thus, a user must either choose to constantly monitor the computer by being in close proximity thereto, or a user can forego and ignore any potential receipt of any incoming information.

SUMMARY OF THE INVENTION

The illustrative embodiments provide computer implemented methods and computer program products for alerting a user to the occurrence of a specified event. A specified event is received at a data processing system. Responsive to receiving the specified event, the data processing system forwards a notification of receipt of the specified event to a universal serial bus transmitter. The universal serial bus transmitter transmits a wireless signal to a remote receiver. Responsive to receiving the wireless signal, the remote receiver triggers an alert notification, notifying a user of the occurrence of the specified event.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
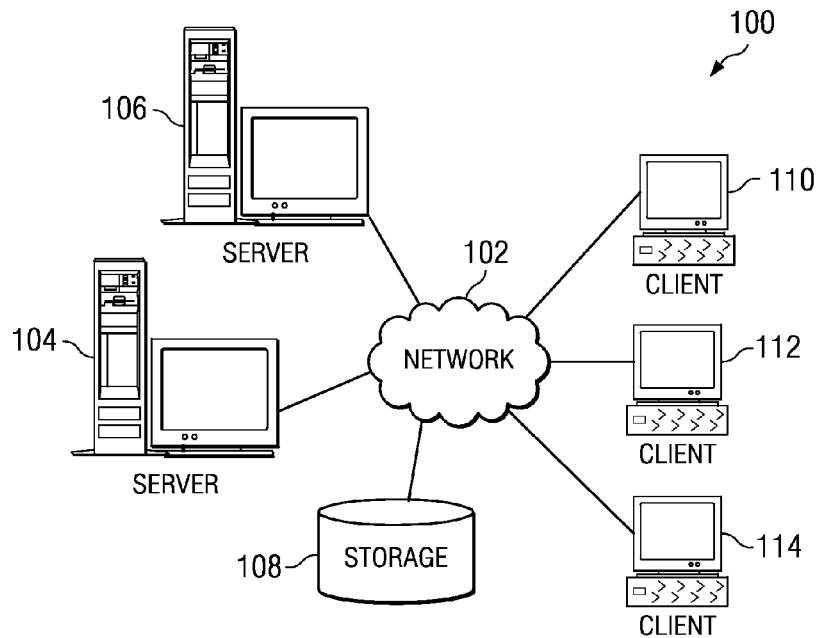
FIG. 1 is a pictorial representation of a network of data processing systems in which illustrative embodiments may be implemented.
Figure 2:
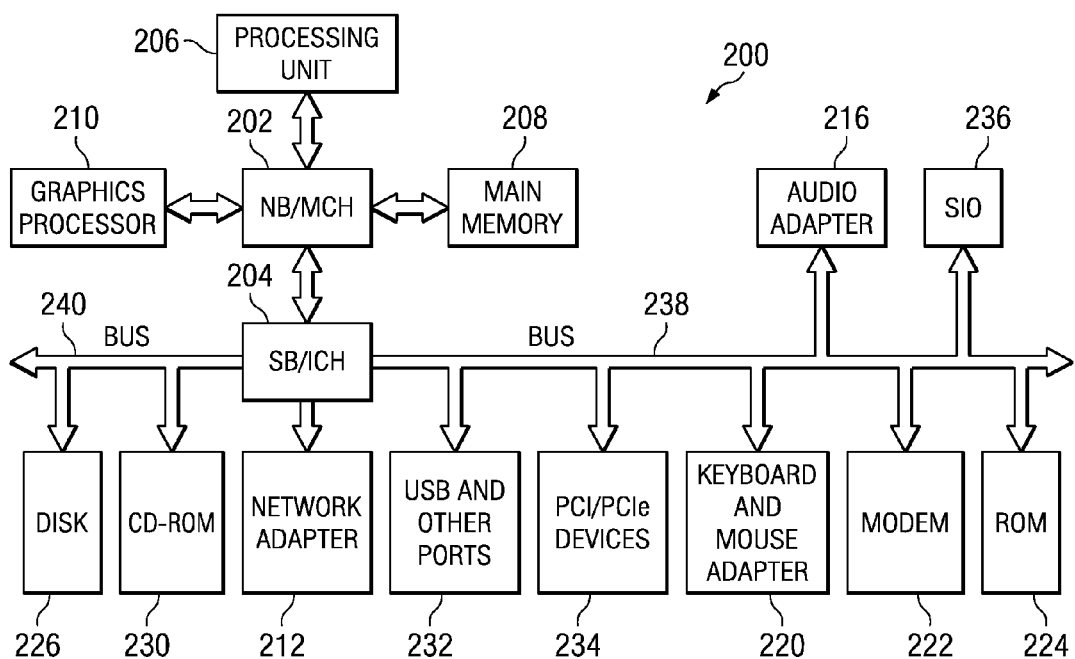
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide computer implemented methods, computer software products, and data processing systems for remotely notifying a user that a specified event has occurred or has been received at a data processing system. A user inputs event information into a data processing system which is stored in an application memory of application. Message information contained in each incoming message received by a messaging service is compared to the event information. In the event that the message information corresponds to the event information, a notification of the event is sent to a short-range wireless transmitter. The wireless transmitter transmits notification of the event to a remote receiver. Upon receipt of the wireless signal, the remote receiver triggers an alert notification notifying the user that the data processing system has received the specified event.

Figure 3:
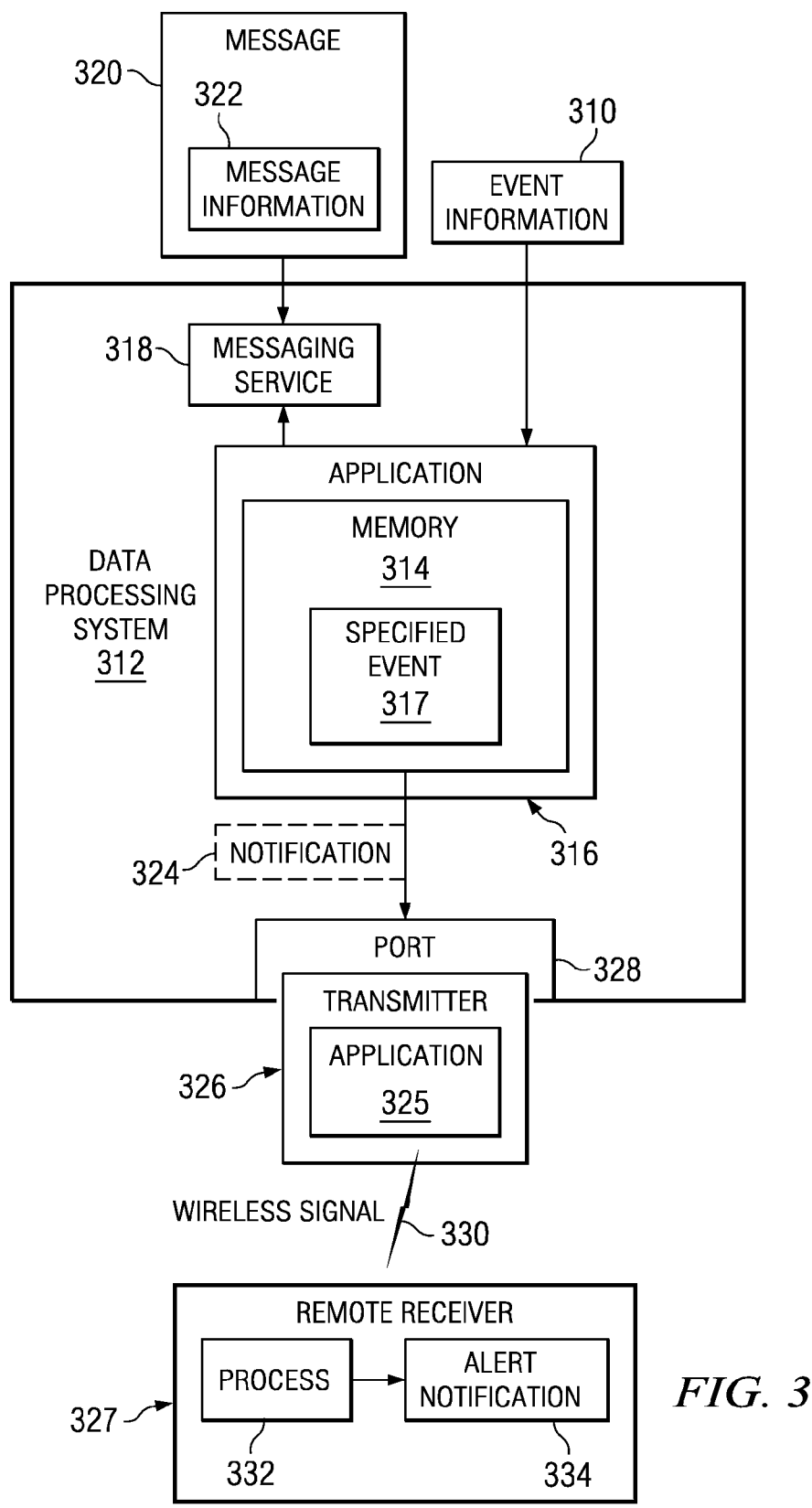
FIG. 3 is a block diagram of A specified event notification process executed on a data processing system in accordance with an illustrative embodiment.

Referring now to FIG. 3, a block diagram of a specified event notification process executed on a data processing system is shown in accordance with an illustrative embodiment. Data processing system 312 depicted in FIG. 3 can be data processing system 200 of FIG. 2.

A user inputs event information 310 into data processing system 312 which is stored in memory 314 of application 316. Event information 310 is a set of user-specified instructions to the application that the user is to be alerted upon the occurrence of a specified event 317 indicated by event information 310. Event information 310 can specify a certain person, an e-mail address, or an instant messaging account. Similarly, event information 310 can specify a subject matter, such as the subject of an e-mail, an auction update, a scheduling of certain calendar events, or other categorical information. Event information 310 can further specify specific parameters, such as stock prices or pricing updates for monitored goods.

Event information 310 is stored in memory 314 of application 316. Application 316 is an ancillary application that works in conjunction with messaging service 318 to alert a user upon the occurrence of a specified event. As used herein, "messaging service" is not limiting. It can refer to any instant messaging application, e-mail application, Internet or intranet communication, or other communication to the user.

Each incoming message 320 received by messaging service 318 includes message information 322. Message information 322 can be information similar to that provided by event information 310. That is, message information 322 can specify a certain person, an e-mail address, or an instant messaging account. Similarly, message information 322 can specify a subject matter, such as the subject of an e-mail, an auction update, a scheduling of certain calendar events, or other categorical information. Message information 322 can further specify specific parameters, such as stock prices or pricing updates for monitored goods.

Application 316 is capable of parsing information or otherwise obtaining information from messaging service 318. In one illustrative embodiment, upon receipt of incoming message 320, application 316 parses message information 322 to determine if incoming message 320 corresponds to event information 310 stored in associated memory 314. Application 316 then compares the parsed message information 322 with event information 310 stored in associated memory 314.

In the event that the parsed message information 322 corresponds to event information 310, application 316 sends notification 324 to application 325 of transmitter 326. Notification 324 is a notice to transmitter 326 that specified event 317 has occurred. Transmitter 326 is a short-range wireless transmission device capable of sending wireless signals to remote receiver 327. Transmitter 326 can utilize any short-range wireless protocol, including, but not limited to, wireless USB, active RFID, DSRC, BLUETOOTH, Wi-Fi, NFC, and ZIGBEE. Transmitter 326 executes application 325.

In one illustrative embodiment, transmitter 326 is an external device that is connected to data processing system 312 at port 328. Port 328 can be any type port, including a serial port, a parallel port, and a universal serial bus (USB) port. In an illustrative embodiment, port 328 is a USB port.

Application 325 transmits notification 324 via wireless signal 330 to remote receiver 327. Remote receiver 327 can be any device capable of receiving wireless signal 330 from transmitter 326. Remote receiver 327 can be, but is not limited to, short-range wireless enabled cellular phones, personal digital assistants, and personal e-mail devices. In an illustrative embodiment, remote receiver 327 is a key fob.

Remote receiver 327 runs process 332. Process 332 polls for wireless signal 330 from transmitter 326. Upon receipt of wireless signal 330, process 332 triggers alert notification 334. Alert notification 334 can be any functionality capable of notifying the user that data processing system 312 has received specified event 317. In the illustrative embodiments, alert notification 334 is an auditory notification signal or a vibratory notification signal.

Figure 4:
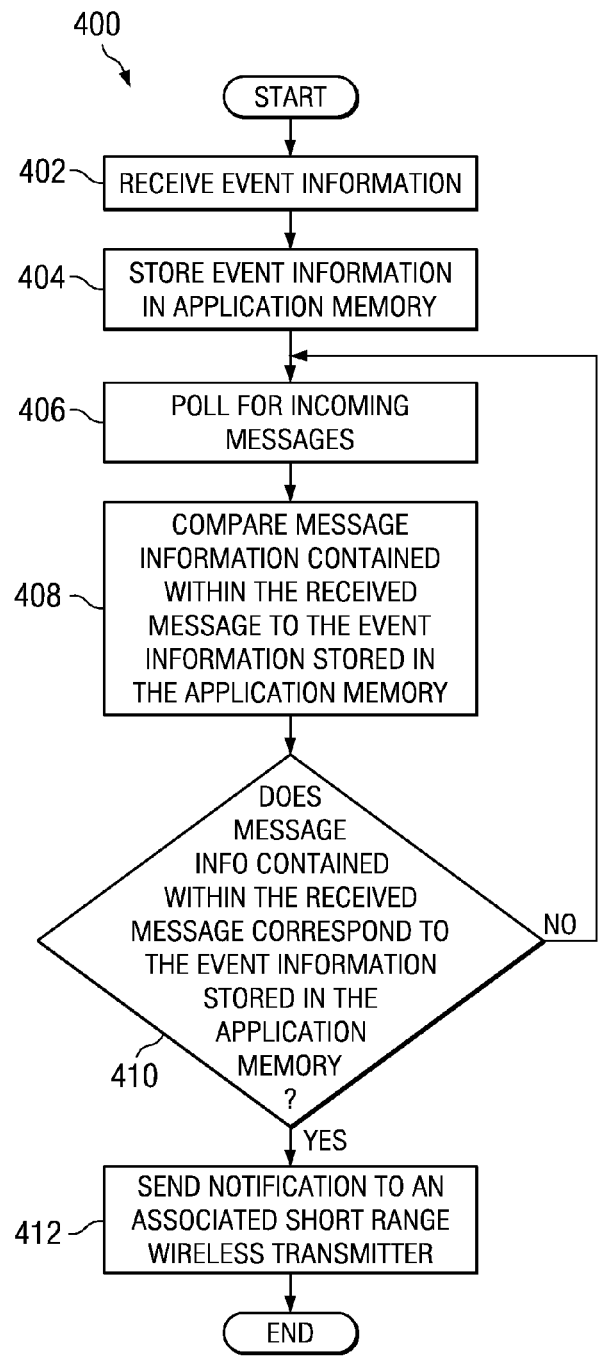
FIG. 4 is a flowchart for a process of parsing incoming messages in accordance with an illustrative embodiment.

Referring now to FIG. 4, a flowchart is shown for a process of parsing incoming messages in accordance with an illustrative embodiment. Process 400, depicted in FIG. 4, is a software process, such as application 316 of FIG. 3. Process 400 can be executed on a data processing system, such as data processing system 312 of FIG. 3.

Process 400 begins by receiving event information (step 402) from a user and storing the event information in application memory (step 404). A user entering event information can specify a number of specific instructions or circumstances, the occurrence of which will prompt an alert from the data processing system to the user. Thus, the event information identifying the specific instructions or circumstances can specify a certain person, such as the sender of an e-mail, an e-mail address, or an instant messaging account. Similarly, event information can specify a subject matter, such as the subject of an e-mail, an auction update, a scheduling of certain calendar events, or other categorical information. Event information can further specify specific parameters, such as stock prices or pricing updates for monitored goods.

Process 400 can be implemented to parse information from messages that are received by a messaging service. Alternatively, process 400 can preview messages prior to their receipt by the messaging service, for example, by parsing information stored in an e-mail client's associated text file. The arrangement of process 400 in relation to the messenger service is not limiting, so long as process 400 is able to obtain event information from incoming or received messages.

Process 400 then begins polling for incoming messages (step 406). Upon receipt of message, process 400 compares message information contained within the received message to the event information stored in the application memory (step 408). Message information can be information similar to that provided by event information. That is, message information can specify a certain person, an e-mail address, or an instant messaging account. Similarly, message information can specify a subject matter, such as the subject of an e-mail, an auction update, a scheduling of certain calendar events, or other categorical information. Message information can further specify specific parameters, such as stock prices, or pricing updates for monitored goods.

Process 400 then determines whether message information contained within the received message corresponds to the event information stored in the application memory (step 410). If message information contained within the received message does not correspond to the event information stored in the application memory ("no" at step 410), process 400 returns to step 406 to poll for subsequent messages.

If message information contained within the received message does correspond to the event information stored in the application memory ("yes" at step 410), process 400 sends a notification to an associated short-range wireless transmitter (step 412), with the process terminating thereafter.

Figure 5:
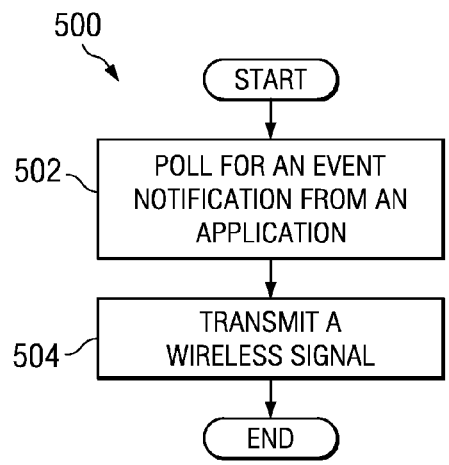
FIG. 5 is a flowchart for a process of wirelessly transmitting a receipt confirmation to a remote receiver in accordance with an illustrative embodiment.

Referring now to FIG. 5, a flowchart is shown for a process of wirelessly transmitting a receipt confirmation to a remote receiver in accordance with an illustrative embodiment. Process 500 depicted in FIG. 5 is a software process, such as application 325 of FIG. 3. Process 500 can be executed on a short-range wireless transmitter, such as transmitter 326 of FIG. 3.

Process 500 begins by polling for an event notification from an application, such as application 316 of FIG. 3 (step 502). The event notification is a notice to transmitter that a user-specified event, such as specified event 317 of FIG. 3, has occurred.

Responsive to receiving the event notification, process 500 transmits a wireless signal (step 504). The wireless signal can be transmitted utilizing any short-range wireless protocol capable of being received by an associated remote receiver. Exemplary short-range wireless protocols include, but are not limited to, wireless USB, active RFID, DSRC, BLUETOOTH, Wi-Fi, NFC, and ZIGBEE. In one illustrative embodiment, process 500 is executed on an external USB device that is connected to a data processing system via a USB port. The wireless signal can then be transmitted from the USB device.

Process 500 terminates after transmitting the wireless signal. Alternatively, process 500 could begin polling for additional and subsequent event notifications (not shown).

Figure 6:
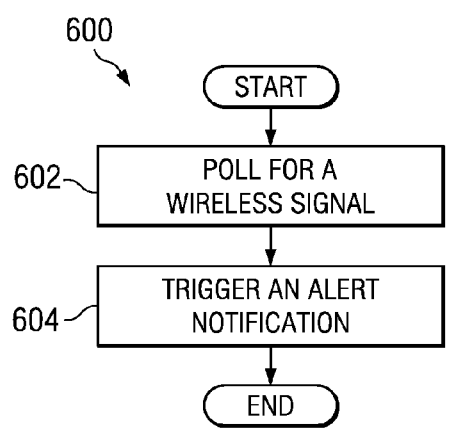
FIG. 6 is a flowchart for a process of wirelessly receiving a receipt confirmation at a remote receiver in accordance with an illustrative embodiment.

Referring now to FIG. 6, a flowchart is shown for a process of wirelessly receiving a receipt confirmation at a remote receiver in accordance with an illustrative embodiment. Process 600 depicted in FIG. 6 is a software process such as process 332 of FIG. 3. Process 600 can be executed on any remote receiver capable of receiving a short-range wireless signal from a transmitter. The remote receiver can be, but is not limited to, short-range wireless enabled cellular phones, personal digital assistants, and personal e-mail devices. In an illustrative embodiment, the remote receiver is a key fob. The remote receiver can be remote receiver 327 of FIG. 3.

Process 600 begins by polling for a wireless signal, such as wireless signal 330 of FIG. 3 (step 602). The wireless signal is a notice to the remote receiver that a user-specified event, such as specified event 317 of FIG. 3, has occurred. The wireless signal can utilize any short-range wireless protocol capable of being received by an associated remote receiver. Exemplary short-range wireless protocols include, but are not limited to, wireless USB, active RFID, DSRC, BLUETOOTH, Wi-Fi, NFC, and ZIGBEE.

Responsive to receiving the wireless signal, process 600 triggers an alert notification (step 604). The alert notification can be any functionality capable of notifying the user that the data processing system has received the specified event. In the illustrative embodiments, the alert notification is an auditory notification signal or a vibratory notification signal.

Process 600 terminates after triggering the alert notification. Alternatively, process 600 could begin polling for additional and subsequent wireless signals (not shown).

While the present processes have been described as software embodiments, these embodiments should be read as limiting. Alternative embodiments can utilize hardware devices wherein the above described processes are hard coded into an associated memory of the hardware device.

Thus the illustrative embodiments provide computer implemented methods and computer software products for remotely notifying a user that a specified event has occurred or been received at a data processing system. A user inputs event information into a data processing system which is stored in an application memory of application. Message information contained in each incoming message received by a messaging service is compared to the event information. In the event that the message information corresponds to the event information, a notification of the event is sent to a short-range wireless transmitter. The wireless transmitter transmits notification of the event to remote receiver. Upon receipt of the wireless signal, the remote receiver triggers alert notification notifying the user that data processing system has received the specified event.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for alerting a user to an occurrence of a specified event, the method comprising:
    receiving event information from the user, wherein the event information indicates a specified event selected from events consisting of receiving an e-mail at a data processing system, receiving an instant message at the data processing system, receiving a stock quote at the data processing system, and receiving financial information at the data processing system, and wherein the event information identifies at least one of a sender of the specified event, a subject matter of the specified event, and specific parameters of the specified event;
    receiving the specified event at the data processing system;
    responsive to receiving the specified event, transmitting a wireless signal from the data processing system to a remote receiver, wherein the wireless signal is transmitted using a transmitter attached to a universal serial port of the data processing system; and
    wherein the remote receiver is selected from a group consisting of a cellular phone, a personal digital assistant, a remote e-mail device, and a key fob.

2. The computer implemented method of claim 1, wherein the wireless signal is transferred using a wireless protocol selected from a group comprising wireless universal serial bus, active radio frequency identification, dedicated short range communications, BLUETOOTH, Wi-Fi, near field communication, and ZIGBEE.

3. A non-transitory computer storage medium having a computer program product encoded thereon for alerting a user to an occurrence of a specified event, the computer program product comprising:
    instructions for receiving event information from the user, wherein the event information indicates a specified event selected from events consisting of receiving an e-mail at a data processing system, receiving an instant message at the data processing system, receiving a stock quote at the data processing system, and receiving financial information at the data processing system, and wherein the event information identifies at least one of a sender of the specified event, a subject matter of the specified event, and specific parameters of the specified event;
    instructions for receiving the specified event at the data processing system; and
    instructions, responsive to receiving the specified event at the data processing system, for transmitting a wireless signal from the data processing system to a remote receiver, wherein the wireless signal is transmitted using a transmitter attached to a universal serial port of the data processing system;
    wherein the remote receiver is selected from a group consisting of a cellular phone, a personal digital assistant, a remote e-mail device, and a key fob.

4. The non-transitory computer storage medium of claim 3, wherein the wireless signal is transferred using a wireless protocol selected from the group comprising wireless universal serial bus, active radio frequency identification, dedicated short range communications, BLUETOOTH, Wi-Fi, near field communication, and ZIGBEE.

5. A computer implemented method for alerting a user to an occurrence of a specified event, the method comprising:
receiving the specified event at a data processing system, wherein the event information indicates a specified event selected from events consisting of receiving an e-mail at the data processing system, receiving an instant message at the data processing system, receiving a stock quote at the data processing system, and receiving financial information at the data processing system, and wherein the event information identifies at least one of a sender of the specified event, a subject matter of the specified event, and specific parameters of the specified event;
responsive to receiving the specified event, forwarding a notification of receipt of the specified even to a universal serial bus transmitter;
responsive to forwarding the notification, transmitting a wireless signal from the universal serial bus transmitter to a remote receiver, wherein the wireless signal is transmitted using a transmitter attached to a universal serial port of the data processing system;
receiving the wireless signal from the universal serial bus transmitter at the remote receiver; and
responsive to receiving the wireless signal, triggering an alert notification at the remote receiver;
wherein the remote receiver is selected from a group consisting of a cellular phone, a personal digital assistant, a remote e-mail device, and a key fob.

6. The computer implemented method of claim 5, wherein the wireless signal is transferred using a wireless protocol selected from the group comprising wireless universal serial bus, active radio frequency identification, dedicated short range communications, BLUETOOTH, Wi-Fi, near field communication, and ZIGBEE.

* * * * *